United States Patent [19]

Lopes

[11] 4,433,774
[45] Feb. 28, 1984

[54] BLANK CONVEYOR APPARATUS

[75] Inventor: Richard R. Lopes, Salem, Wis.

[73] Assignee: Stone Container Corporation, Chicago, Ill.

[21] Appl. No.: 243,358

[22] Filed: Mar. 13, 1981

[51] Int. Cl.³ ............................................. B65G 47/91
[52] U.S. Cl. ..................................... 198/689; 198/862
[58] Field of Search ............... 271/197, 196, 276, 198; 414/72, 73; 198/689, 422, 570, 586, 862, 863; 83/100, 152, 94

[56] References Cited

U.S. PATENT DOCUMENTS

3,328,027  6/1967  Schmidtke ......................... 271/197

Primary Examiner—Jeffrey V. Nase
Assistant Examiner—Dennis J. Williamson
Attorney, Agent, or Firm—Hume, Clement, Brinks, Willian & Olds, Ltd.

[57] ABSTRACT

An improved conveyor system for transporting die-cut blanks from a rotary die cutter to a blank stacking device includes a blank take-up section comprising a spring biased take-up guide which insures that blanks are positively engaged by the conveyor system before they are released by the die cutter. The conveyor system includes a vacuum belt which serves to suspend and transport die-cut blanks while maintaining them in precise registry to a blank stacking device. An improved snubbing device is disclosed which decelerates blanks without damage to the blanks themselves and then causes the decelerated blanks to rebound back toward the die cutter for improved stacking. A ramp structure is disclosed which flexes blanks near the blank release section of the conveyor system such that the trailing edge of transported blanks snap away from the conveyor system, thereby positively disengaging the blanks from the conveyor.

8 Claims, 12 Drawing Figures

BLANK CONVEYOR APPARATUS

BACKGROUND OF THE INVENTION

This invention relates to an improved conveying apparatus for conveying a series of die-cut blanks from a rotary die cutter to a blank stacking device.

Rotary die cutters are commonly used to die-cut blanks out of paper or corrugated board stock. These blanks are then stacked for shipping and storage, and are then assembled into containers or the like at some time prior to use. In the past, conveyor systems which have been used to transport die-cut blanks from a rotary die cutter to a blank stacking device have suffered from certain disadvantages.

For example, one approach of the prior art has been to utilize a sandwich belt which takes up blanks as they leave the die cutter. This sandwich belt is vibrated to shake loose scrap, and it operates to drop die-cut blanks onto a conveyor belt which in turn conveys the blanks to a blank stacking apparatus. In such prior art conveyor systems, blanks will often skew, either while on the vibrating sandwich belt, while in the transition between the sandwich belt and the conveyor belt, while on the conveyor belt, or as they leave the conveyor belt and enter the stacking apparatus. Closely spaced side guides can help to align blanks in these prior art conveyor systems; however, closely spaced side guides can also serve to jam a skewed blank.

In order to reduce the problem of skewed and jammed blanks in the conveyor systems of the prior art, it is common practice to operate the entire die cutting operation at a relatively slow speed. While this approach does serve to alleviate the problem of skewed and jammed blanks, it can materially decrease the output of a rotary die cutter. In one system of the prior art, a die cutter designed to operate at a maximum rate of 10,000 blanks per hour was often operated at the much slower rate of 4,000 blanks per hour in order to reduce jamming of blanks in the conveyor system. Such slow speed operation results in severe underutilization of the die cutter.

SUMMARY OF THE INVENTION

The present invention is directed to an improved conveyor system for conveying die-cut blanks from a rotary die cutter to a blank stacking device, which to a large degree overcomes these and other problems of the prior art.

According to this invention, vacuum belt conveyor means are provided for suspending and transporting die cut blanks from a rotary die cutter to a blank stacking device. This conveyor means comprises a perforated belt, means for translationally moving the belt, and means for generating a subatmospheric pressure on one side of the belt such that blanks brought into contact with the other side of the belt are held against the belt by atmospheric pressure. This conveyor means includes a blank take-up section and a blank release section. Means are provided for positioning the conveyor means between the rotary die cutter and the stacking device such that the blank take-up section is adjacent the die cutter, the blank release section is adjacent the stacking device, and the conveyor means operates automatically to engage blanks before they have been released by the die cutter, to retain blanks in registry as they are transported to the stacking device, and then to release the in-registry blanks to the stacking device. Preferably, the conveyor means comprises a plurality of perforated belts positioned side by side.

This invention provides a number of important advantages. Because the vacuum belt conveyor means operates to engage die-cut blanks positively before they are released by the rotary die cutter, it operates to retain and hold the die-cut blanks in precise registry from a point before they are released by the die cutter until they are released into the stacking device. In this way the tendency of prior art devices to allow die-cut blanks to skew and jam is markedly reduced. This in turn allows high operating speeds with reduced jamming. In addition, since the conveyor means includes one or more vacuum belts, it can operate to retain the die-cut blanks in registry until they are situated over the stacking device. In this way a precise, in-registry movement of the die-cut blanks from the conveyor to the stacking device is made possible.

The present invention, together with further objects and attendant advantages, will best be understood by reference to the following detailed description taken in connection with the accompanying drawings.

DETAILED DESCRIPTION OF THE PRESENTLY PREFERRED EMBODIMENTS

Figure 1:
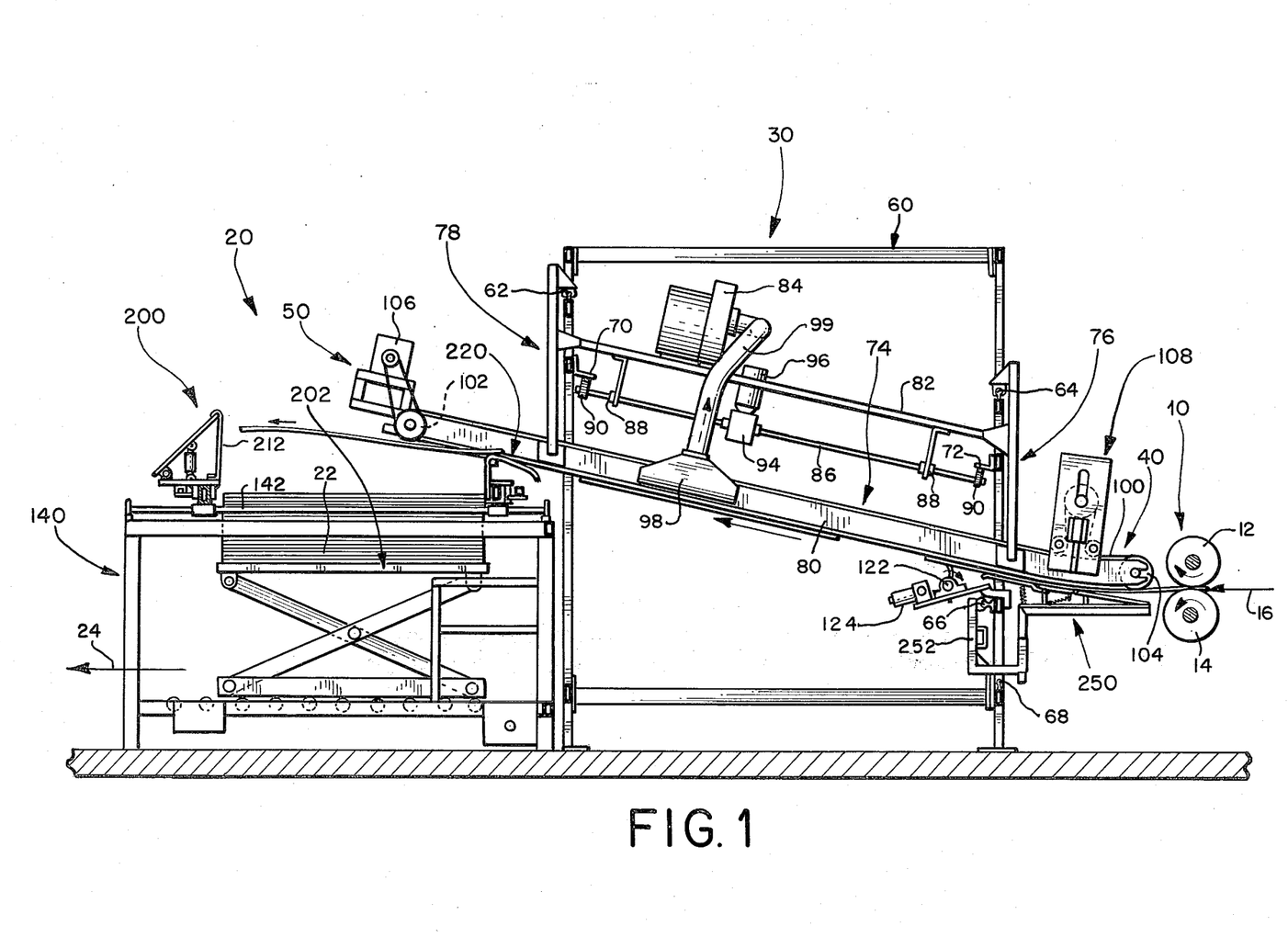
FIG. 1 is a side elevational view of a conveyor system for conveying a series of die cut blanks from a rotary die cutter to a blank stacking device, which conveyor system incorporates preferred embodiments of each of the features of the invention discussed above.

Turning now to the drawings, FIG. 1 shows a side elevational view of a blank conveyor system which incorporates preferred embodiments of each of the features of the invention discussed above. In general terms, FIG. 1 shows a conveyor system 30 which operates to transfer die-cut blanks from a rotary die cutter 10 to a blank stacking device 20.

Both the rotary die cutter 10 and the blank stacking device 20 are standard articles of commerce familiar to those skilled in the art, which do not per se form a part of the present invention. Accordingly, these elements will not be described in detail. Here, it is enough to state that the rotary die cutter 10 comprises two cylinders 12, 14. The upper cylinder 12 is the die cylinder, and the lower cylinder 14 is the anvil cylinder. Paper or corrugated board stock is fed between the two cylinders 12,14 in the direction of the arrow 16, and the rotary die cutter 10 serves to stamp out blanks of the desired configuration as the cylinders 12,14 rotate in unison. Die-cut blanks emerge from the rotary die cutter 10 and are then passed on to the conveyor system 30.

The blank stacking device serves to stack die-cut blanks in the region 22. Preferably, this blank stacking device 20 includes means for maintaining the uppermost surface of the stack of blanks in the region 22 at a substantially constant level by automatically lowering the bottom of the stack in the region 22 as necessary to achieve this end. Preferably, the stacking device 20 includes means (not shown) for holding the uppermost blanks in place once the bottom of the stack in the region 22 reaches a predetermined point, as well as means (not shown) for automatically rejecting a completed stack in the direction of the arrow 24. Thus, the blank stacking device 20 operates to maintain the uppermost surface of the stack of blanks in the region 22 at a substantially constant, predetermined level. In this preferred embodiment, the blank stacking device 20 comprises a standard Southworth Life Table (Model No. LST-4-48) used in conjunction with four 30"×84" Litton power driven roller conveyor units (Model No. LR352).

Turning now to the improved conveyor system of this invention, this conveyor system 30 includes a blank take-up section 40 mounted adjacent the rotary die cutter 10 and a blank release section 50 positioned partially over the blank stacking device 20. Included in the conveyor system 30 are a resilient snubbing device 200 and a pair of spaced lateral ramps 220 mounted adjacent the blank release section 50, as well as a take-up guide 250 mounted adjacent the blank take-up section 40 of the conveyor system 30. The following discussion will take up each of these elements of the conveyor system 30 in turn.

Figure 2:
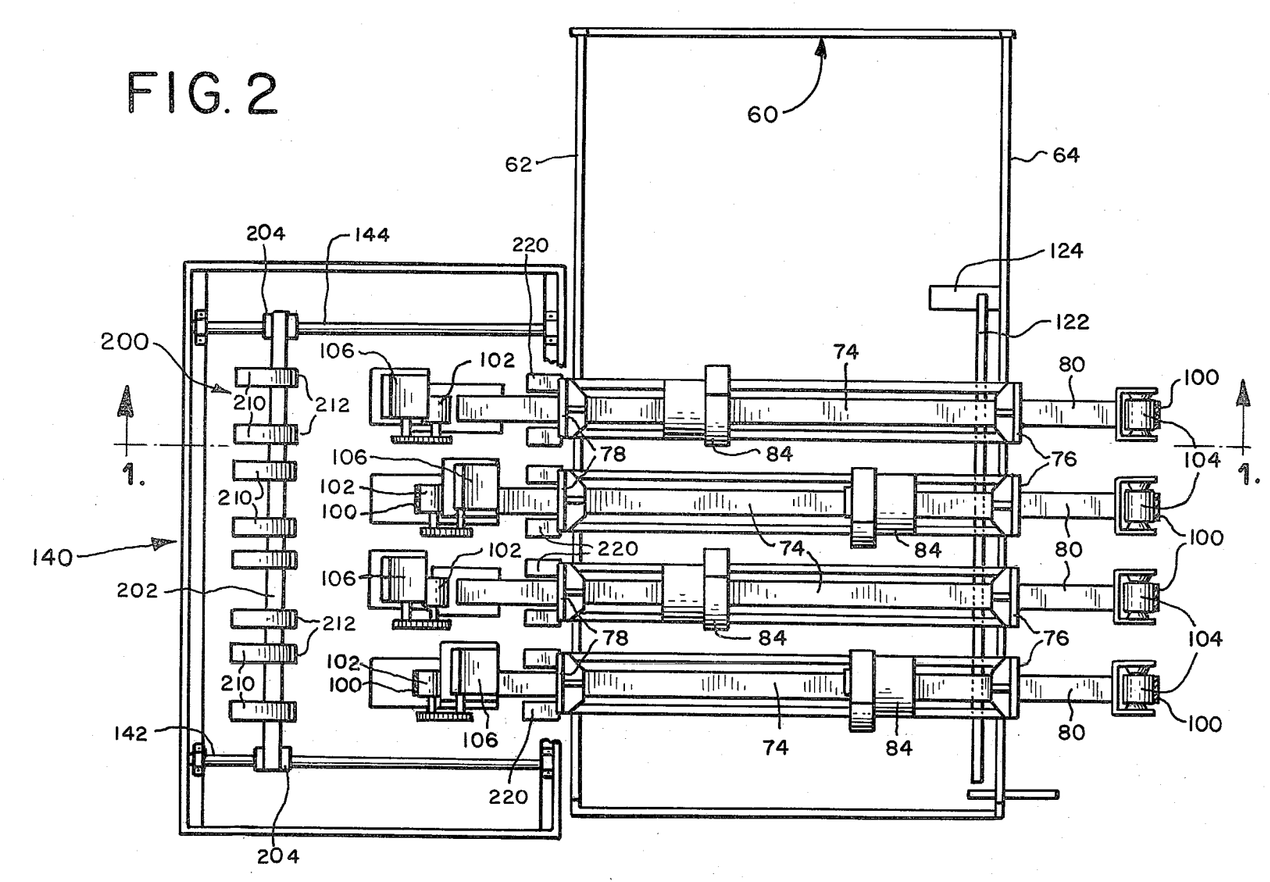
FIG. 2 shows a plan view of the conveyor system of FIG. 1.

As best shown in FIGS. 1 and 2, the central portion of the conveyor system 30 is mounted on a frame 60 which is substantially rectangular in shape. This frame 60 defines two spaced, parallel upper guide bars 62,64, which are oriented substantially parallel to the longitudinal axis of the rotary die cutter 10. In addition, the frame 60 includes two lower guide bars 66,68, which are also oriented substantially parallel to the longitudinal axis of the rotary die cutter 10. The frame 60 includes adequate structural bracing to maintain each of the guide bars 62,64,66,68 in the configuration described above. In addition, the frame 60 includes two gear racks 70,72, each of which is also mounted to extend parallel to the longitudinal axis of the rotary die cutter 10.

Mounted to the frame 60 near the blank release sections 50 of the vacuum belt assemblies 74 is an additional frame 140 which comprises two spaced, parallel guide bars 142,144. Each of these guide bars 142,144 is rigidly mounted to extend perpendicularly to the longitudinal axis of the die cutter 10. As will be explained below in connection with FIG. 5, this additional frame 140 is used to provide flexibility of mounting for the snubbing devices 200 and the lateral ramps 220.

In this preferred embodiment, four separate and individual vacuum belt assemblies 74 are mounted to slide on the upper guide bars 62,64, as shown in FIGS. 1 and 2. These four vacuum belt assemblies 74 are quite similar one to another and the following discussion is representative of each of the vacuum belt assemblies 74.

Each assembly 74 includes a first yoke assembly 76 which is mounted to slide along the guide bar 64, and a second yoke assembly 78 which is mounted to slide along the guide bar 62. A vacuum chamber 80 is rigidly mounted between the first and second yoke assemblies 76,78 such that the vacuum chamber 80 slopes upwardly at a predetermined angle of about 12° in this embodiment. An upper cross brace 82 serves further to strengthen the vacuum belt assembly 74. In addition, the upper cross brace 82 serves as a mounting structure for a blower 84. In this preferred embodiment the blower 84 is a Dayton Model 3NO86 5HP Code H, Frame 182T (Arrangement Number 4-Clockwise Upblast).

A drive shaft 86 is mounted under the upper cross brace 82 by means of two spaced bearings 88. This drive shaft 86 terminates at each end in a spur gear 90 which is sized to mesh with a respective one of the gear tracks 70,72. The drive shaft 86 is rotated by a 50:1 gear reducer 94 which is in turn driven by a one half horsepower motor 96. When powered, the motor 96 serves to rotate the drive shaft 86 and thereby to cause the vacuum belt assembly 74 to move along the guide rails 62,64. The air intake of the blower 84 is coupled to the interior of the vacuum chamber 80 by means of a shroud 98 and a flexible hose 99. Thus, the blower 84, when activated, serves to draw air from the interior of the vacuum chamber 80, thereby creating a subatmospheric pressure within the vacuum chamber 80.

The vacuum belt assembly 74 is provided with a perforated vacuum belt 100 which runs between end pulleys 102,104. The vacuum belt 100 is driven by a drive motor 106, which is this preferred embodiment is a Reliance three horsepower DC drive motor which operates in the range of 300–1725 rpm with a 4.5:1 speed reduction to give belt speeds in the range from 300–1200 feet per minute. In addition, the vacuum belt assembly 74 includes a belt tensioning device 108 which comprises three idler rollers 112,114,116. The screw 118 operates to adjust the position of the upper idler roller 116, and thereby the tension of the vacuum belt 100.

Figure 10:
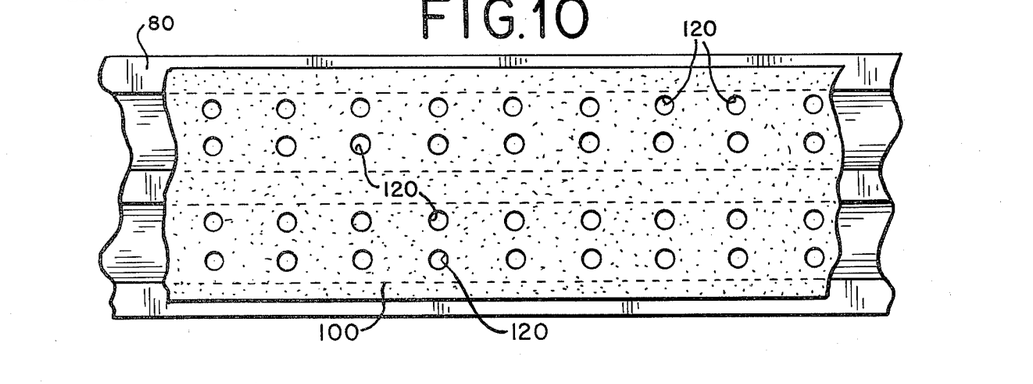
FIG. 10 is a bottom view of a portion of the vacuum belt taken along line 10—10 of FIG. 3.

FIG. 10 shows an enlarged view of the vacuum belt 100. In this preferred embodiment the belt 100 is six inches in width and is formed of a three-ply white neoprene belting. A regular array of perforations 120 are formed in the belt 100. Each of these perforations 120 passes completely through the belt 100 and is approximately ½ inch in diameter. These perforations 120 are arranged in rows of four, which rows are separated by two inches between centers. This configuration for the perforations 120 has been found to provide adequate suction to enable the vacuum belt assembly 74 to suspend and transport a wide variety of die-cut blanks.

As best shown in FIG. 2, the frame 60 extends considerably beyond the rotary die cutter 10 at one end. As previously explained, each of the vacuum belt assemblies 74 is independently movable along the guide bars 62,64. Thus, the four vacuum belt assemblies 74 can all be positioned in front of the rotary die cutter 10, as shown in FIG. 2, or alternately one, two or three of the vacuum belt assemblies 74 can be moved out of alignment with the rotary die cutter 10 if it is desirable to use fewer than all four vacuum belt assemblies 74 at any one time. Because each vacuum belt assembly 74 includes its own drive motor 106, motor 96 and blower 84, there is no requirement that the vacuum belt assemblies 74 be used together. As shown in FIGS. 1 and 2, a flail drive shaft 122 and a flail drive motor 124 are also mounted to the frame 60. The structure and operation of the flails which are driven by the flail drive shaft 122 will be described below in connection with FIG. 3.

Figure 4:
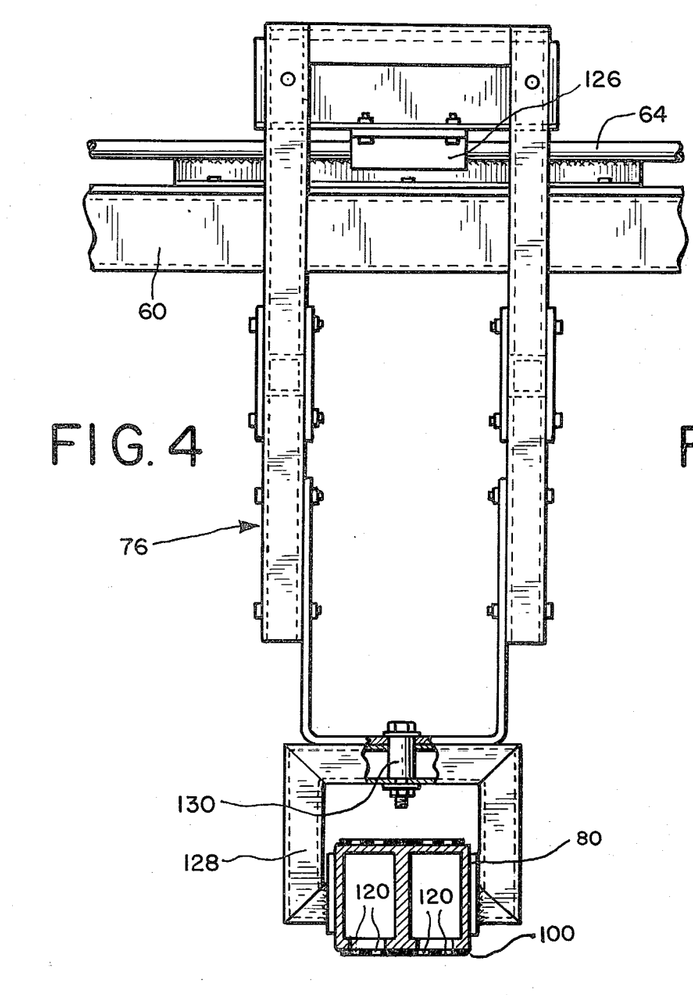
FIG. 4 is a sectional view taken along line 4—4 of FIG. 3.

As shown in FIG. 4, the first yoke assembly 76 is guided on the guide bar 64 by means of a guide bushing 126. This first yoke assembly 76 includes a lower yoke 128 which serves directly to support the vacuum chamber 80. The lower yoke 128 is pivotably mounted by means such as a pin 130 to the rest of the first yoke assembly 76. Thus, the lower yoke 128 and the vacuum chamber 80 are free to pivot about the pin 130.

Figure 8:
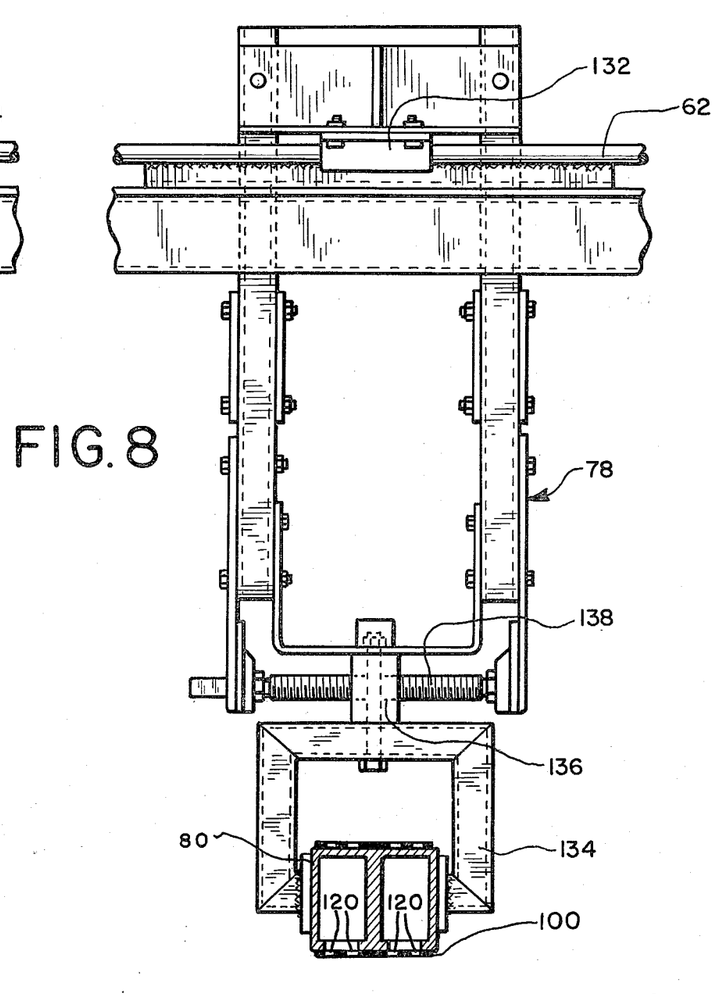
FIG. 8 is a sectional view taken along line 8—8 of FIG. 5.

As shown in FIG. 8, the second yoke assembly 78 is mounted to slide along the guide bar 62 by means of a guide bushing 132. This second yoke assembly 78 also includes a lower yoke 134 which is in turn attached to the vacuum chamber 80. This lower yoke 134 is pivotably mounted to a follower 136 which is in turn mounted to move along a lead screw 138. Thus, by rotating the lead screw 138 the lower yoke 134 can be moved laterally from the central position (as shown in FIG. 8) to either side by as much as about four inches. As will be explained below, this lateral movement of the lower yoke 134 can be used to increase the lateral separation between the vacuum belt assemblies 74 at the respective blank release sections 50.

Figure 3:
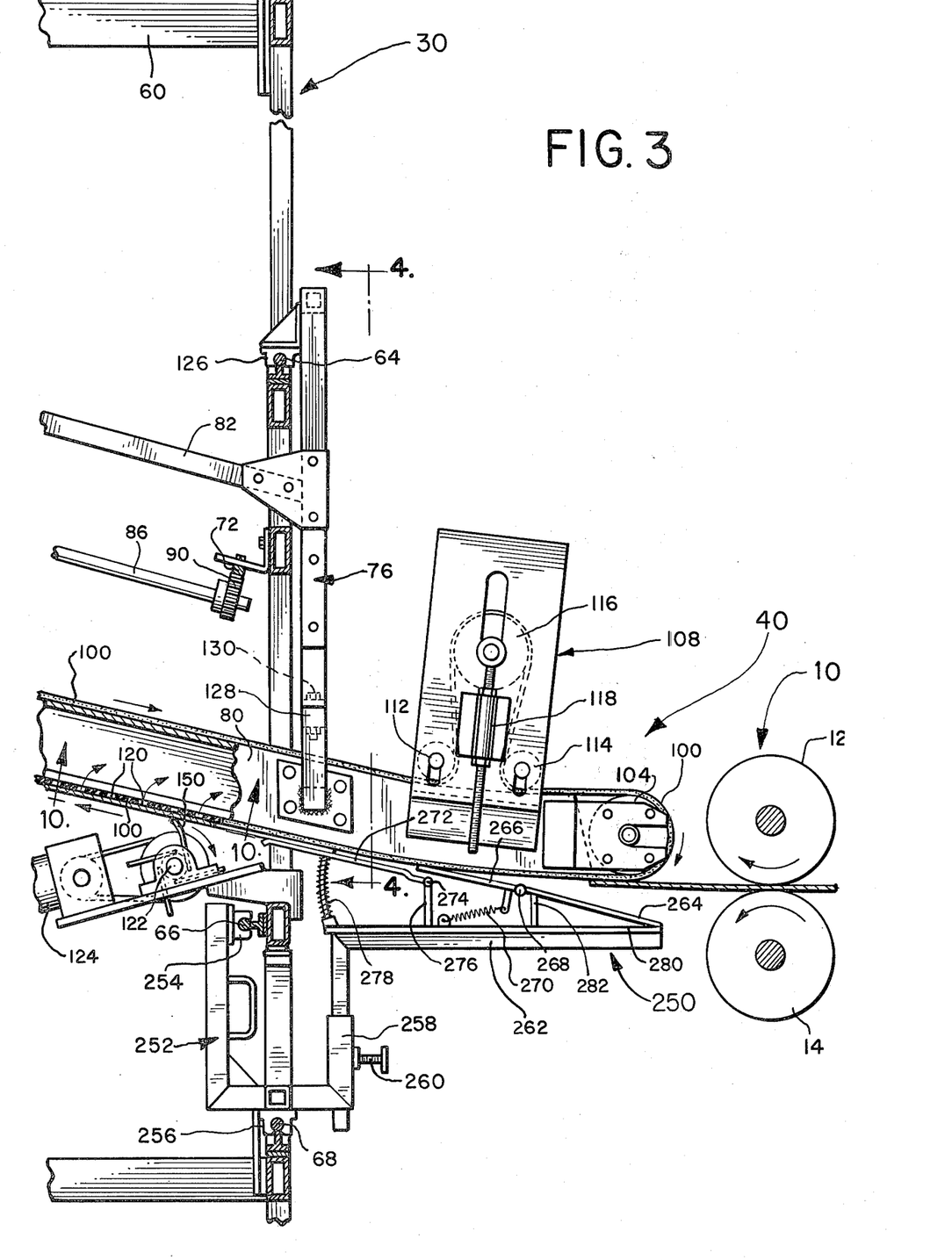
FIG. 3 shows an enlarged side elevational view of the portion of the conveyor system of FIG. 1 adjacent the rotary die cutter.

Turning now to FIG. 3, a separate take-up guide 250 is provided for each of the four vacuum belt assemblies 74. Each take-up guide 250 includes a take-up guide frame 252 which is positioned to slide along the lower guide bars 66,68 by means of guide bushings 254, 256, respectively. The take-up guide frame 252 comprises a vertically oriented collar 258 which includes means for mounting a locking screw 260. A guide support bar 262 is held within the collar 258 by means of the locking screw 260, such that the the vertical position of the guide support bar 262 can be adjusted as desired and then locked in position.

Mounted on the guide support bar 262 is a base 280 which serves as a support for the first, second, and third guide sections 264,266,272, respectively. The first guide section 264 is rigidly mounted to the base 280 so as to terminate near a support member 282. Thus, the first guide section 264 is rigidly mounted to the guide support bar 262. The second guide section 266 is pivotably mounted by means of a pivot 268 to the first guide section 264. A spring 270 is provided to bias the second guide section 266 resiliently against the vacuum belt 100. The third guide section 272 is pivotably mounted by means of a pivot 274 to a support member 276. A second spring 278 is provided to bias the third guide section 272 resiliently against the vacuum belt 100.

The springs 270,278 serve to bias the second and third guide sections 266,272, respectively, such that each contacts die-cut blanks as they emerge from the rotary die cutter 10 along a line, and each serves to urge the die-cut blanks against the vacuum belt 100. Thus, the take-up guide 250 operates to contact die-cut blanks in a low friction manner and to urge them into engagement with the vacuum belt 100, substantially without damaging or cracking the blanks and without exerting undue frictional forces on the blanks.

In order further to reduce the prospect of bent or broken blanks, the take-up section 40 of the conveyor system 30 is provided with a leading edge which is substantially horizontal. This leading edge is followed by a curved section which has a radius of curvature of about 78 inches in this preferred embodiment. This curved section serves as a transition between the horizontal leading edge of the conveyor system 30 and the sloped intermediate portion. It has been found that this large radius of curvature provides a smooth transition from a horizontal die-cut blank to an upwardly sloping blank without exceeding the elastic limits of the blank.

The guide support bar 262 should be positioned inside the collar 258 such that the second and third guide sections 266,272 press against die-cut blanks as they emerge from the die cutter 10 with sufficient force to position them firmly against the vacuum belt 100 such that the blanks are engaged by the vacuum belt 100.

Also shown in FIG. 3 is a scrap flail 150 which operates to dislodge scrap in internal cut outs on the die cut blanks. This flail 150 comprises a hub mounted on the flail drive shaft 122. The hub serves to mount a plurality of strips of canvas about 6 inches in length. These strips are cut into ¼ inch wide portions for a length of five inches from the outer end. Preferably, the scrap flail is rotated at about 500 rpm such that the canvas strips come into contact with the die cut blanks. In addition, it may be desirable to use brushes to remove hanging scrap not totally removed by the flail, alone or in combination with air jet positioned to dislodge scrap from the blanks.

Figure 5:
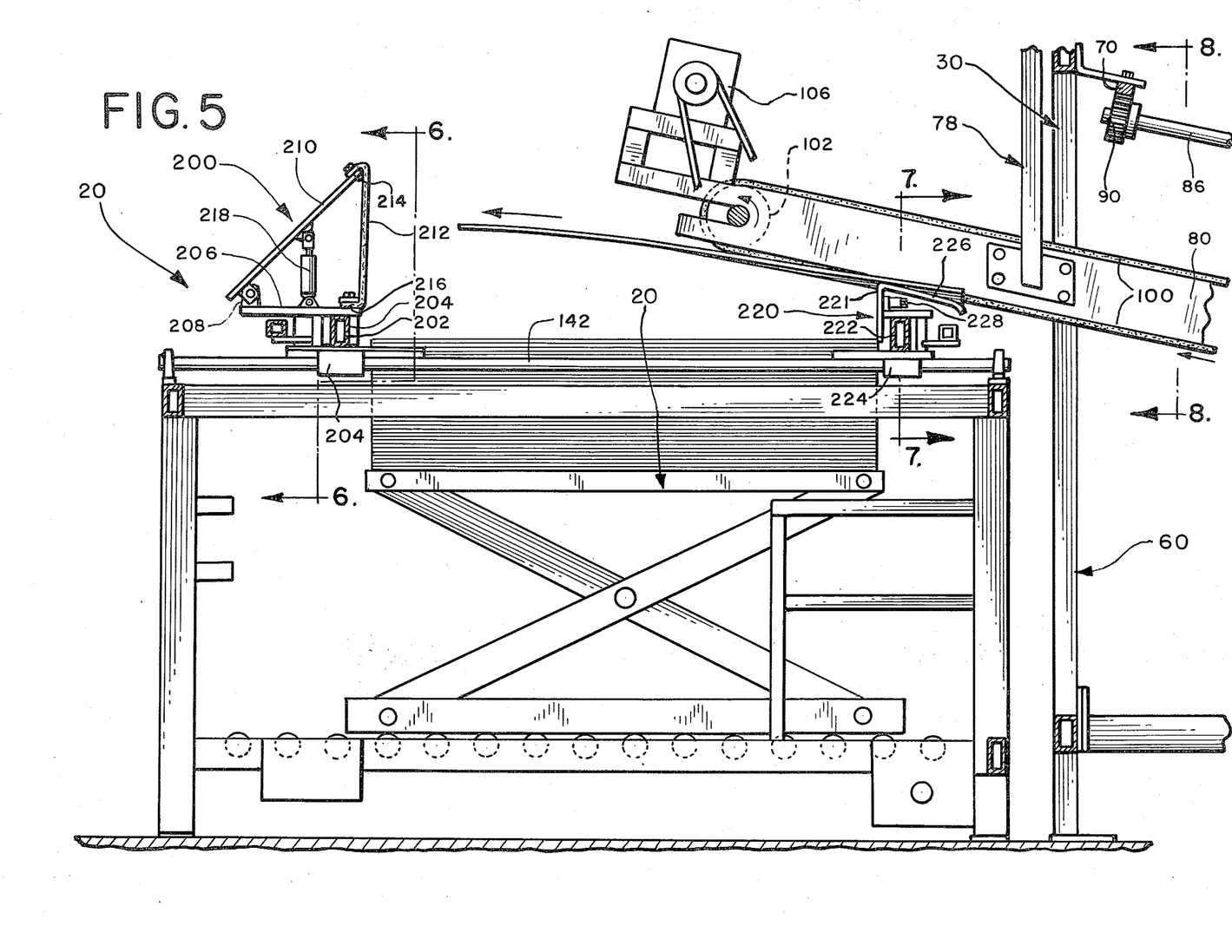
FIG. 5 is an enlarged side elevational view of the portion of the conveyor system of FIG. 1 adjacent the stacking device.
Figure 6:
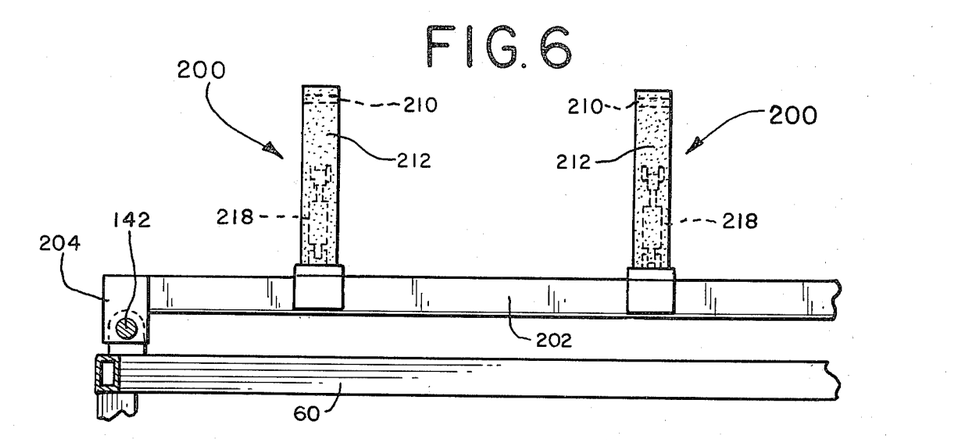
FIG. 6 is a sectional view taken along line 6—6 of FIG. 5.

Turning now to FIG. 5, a guide rail 202 is mounted to slide along the parallel guide bars 142,144 by means of guide bushings 204. In this preferred embodiment, a total of eight snubbing devices 200 are mounted to slide along the guide rail 202 such that two respective ones of the snubbing devices 200 can be positioned in alignment with each of the vacuum belt assemblies 74. As shown in FIGS. 5 and 6, each snubbing device 200 includes a base number 206 which defines a pivot 208. In each case a frame member 210 is mounted to move in the respective pivot 208 such that the frame members 210 move in a plane perpendicular to the plane of the parallel guide bars 142,144. Each snubbing device 200 includes a strap 212 which in this preferred embodiment is formed of two inch wide three-ply web belting. Each strap 212 is attached at its upper end to a strap attachment point 214 on the frame member 210, and at its lower end to a lower attachment point 216 on the respective base member 206.

Each snubbing device 200 also includes an air cylinder 218 which is mounted between the frame member 210 and the base member 206 such that movement of the frame member 210 about the pivot 208 causes the air cylinder 218 either to be retracted or extended. In use, each air cylinder 218 is, in its rest position, oriented such that the air cylinder rod is halfway extended and the air pressure is such that the air cylinder 218 serves resiliently to bias the frame member 210 and therefore the strap 212 into the rest position shown in FIG. 5.

Preferably, each snubbing device 200 is laterally positioned on the guide bar 202 such that blanks which have left the vacuum belt assembly 74 strike the straps 212 at positions on the blanks which are well-suited to absorb acceleration loads placed on the blanks by the straps 212 without damaging the blanks themselves. As will be explained in greater detail below in connection with FIGS. 9a-9c, the snubbing devices 200 act to decelerate moving blanks without damaging the blanks, and then to cause decelerated blanks to rebound in order better to control the position of blanks within the stack in the region 22.

Figure 7:
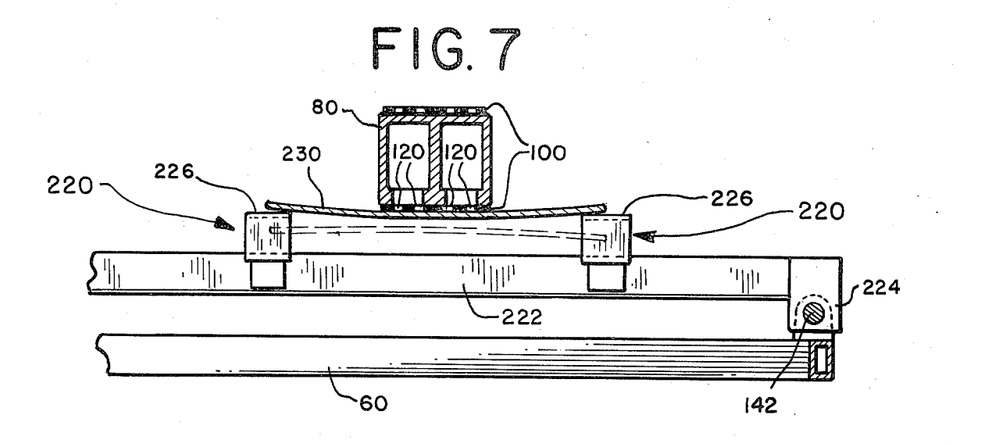
FIG. 7 is a sectional view taken along line 7—7 of FIG. 5.

As best shown in FIGS. 5 and 7, the guide bars 142,144 also serve to support a cross bar 222 by means of guide bushings 224. A pair of adjustable ramps 220 are slidably positioned on the cross bar 222 for each of the four vacuum belt assemblies 74. Each ramp 220 includes an upper surface 226, the position of which is vertically adjustable by means of a locking screw 228. For many blanks, it has been found preferable to position one of the ramps 220 on each side of the vacuum belt assembly 74 such that a ramp 220 is situated about six inches beyond each edge of each of the vacuum belts 100. It is often preferable that the uppermost portion of the upper surface 226 be above the lowermost surface of the belt 100 by a distance of about ¼ inch.

As shown in FIG. 7, the ramps 220 cooperate with the belt 100 to flex blanks being transported by the belt 100 into a concave shape in which the concave surface of the blank is directed toward the belt 100. In FIG. 7, the reference numeral 230 is used to denote a die-cut blank positioned on the belt 100. Preferably, each of the ramps 220 drops off sharply at its trailing edge 221. When flexed blanks are carried past the abrupt drop-off of the trailing edge 221 of the ramps 220, the flexed blank is allowed to resume its normal, flattened shape. In this way, the blank is caused to snap away from the belt 100, thereby causing the blank to disengage sharply and cleanly from the belt 100. As will be explained below in connection with FIGS. 9a-9c, this snapping action serves to reduce jamming and to improve stacking of the die-cut blanks.

Having explained the structure of this preferred embodiment, its operation can now be described. As the cylinders 12,14 of the rotary die cutter 10 rotate, die-cut blanks are passed toward the blank take-up section 40 of the conveyor system 30. These die-cut blanks are then pressed against the vacuum belt 100 by the take-up guide 250 such that the subatmospheric pressure inside the vacuum chamber 80 causes atmospheric pressure to hold die-cut blanks against the underside of the belt 100. Suction generated by the blower 84 should be adequate to provide positive engagement between the vacuum belt 100 and die-cut blanks, even for the first die-cut blank emerging from the die cutter 10. Preferably, the vacuum inside the vacuum chamber 80 is above four inches of water column and most preferably in the range of six to eight inches of water column.

The vacuum belt 100 serves to suspend and transport die-cut blanks from the die cutter 10 to the stacking device 20. It should be clearly understood that the blank take-up section 40 of the conveyor system 30 is positioned immediately adjacent the die cutter 10 such that die-cut blanks are positively engaged by the belt 100 before they are completely released by the die cutter 10. In this way the blanks are maintained precisely in registry and are not allowed to skew or shift during the transition from the die cutter 10 to the vacuum belt 100. The conveyor system 30 serves to retain the die-cut blanks in registry as they are transported to the stacking device 20. As the blanks are transported past the ramps 220, they are flexed into a concave shape in which the outer edges of the blank are raised with respect to the center of the blank. Then, as the trailing edge of the blank is carried past the edge of the ramps 220, the blank is allowed to snap back to its original position, thereby positively disengaging the trailing edge of the blank from the vacuum belt 100.

Figure 9A:
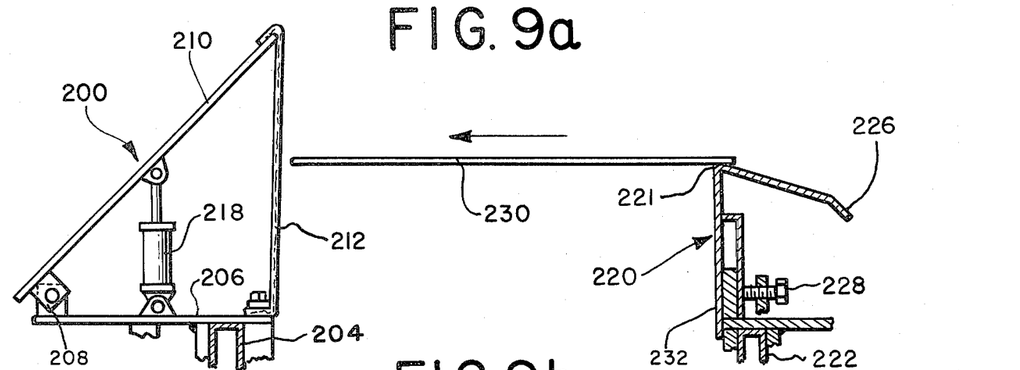
FIGS. 9a, 9b, and 9c are sequential side elevational views of the snubbing device of FIG. 5, showing its operation.
Figure 9B:
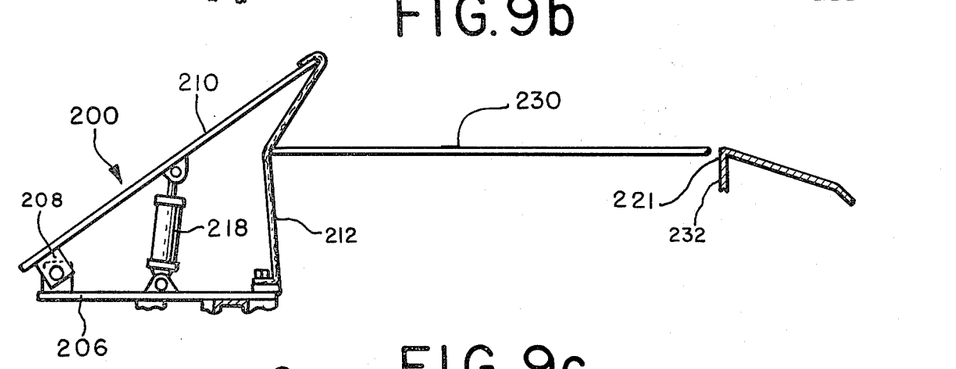
Figure 9C:
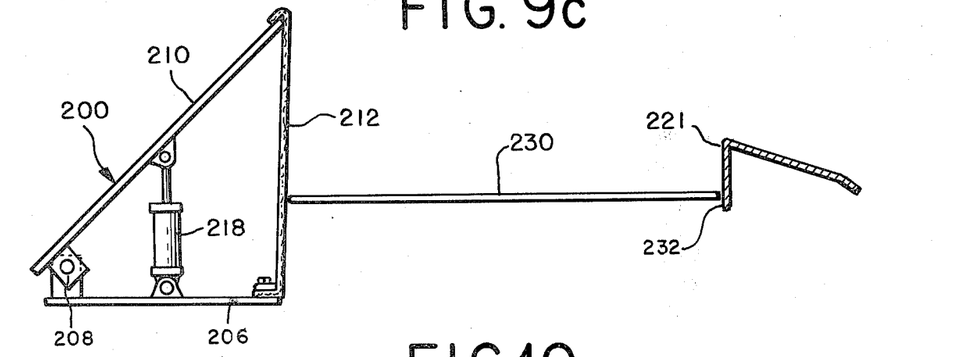

As shown in FIGS. 9a-9c, the snubbing device 200 acts to decelerate the moving blank 230 and then to cause it to rebound back toward the die cutter 10. FIG. 9a shows the position of the snubbing device 200 immediately prior to the impact of a blank 230 against the strap 212. As shown in FIG. 9b, once the moving blank 230 contacts the strap 212, the strap 212 is deflected, thereby pivoting the frame member 210 about the pivot 208 and compressing the air cylinder 218. FIG. 9b shows the snubbing device 200 at the instant when the blank 230 is arrested and the air cylinder 218 is maximally compressed. After this point, the air cylinder 218 serves to restore the snubbing device 200 to the position shown in FIG. 9c. In so doing, the blank 230 is caused to rebound back toward the die cutter 10. Of course, during the deceleration and rebound of the blank 230, the trailing edge of the blank 230 has been moving downward, having previously snapped off of the vacuum belt 100 as described above. Thus, as the blank 230 rebounds the trailing edge of the blank comes into contact with the stop 232. The blank then falls down between the straps 212 and the stop 232 to become part of the growing stack of die-cut blanks.

It has been found that by combining the ramps 220 and the snubbing device 200 it is possible to place the stop 232 close to the desired edge of the stack, thereby producing a straight edged stack of blanks. Furthermore, the ramps 220 serve to reduce jamming by quickly snapping the trailing edge of the blanks away from the belt 100, thereby preventing a blank from striking following blanks as it rebounds from the snubbing device 200. The snubbing devices 200 as well as the ramps 220 are adjustable both in the direction of blank movement and transverse to the direction of blank movement in order to provide complete and flexible control over blank positioning and deceleration.

It should be noted that the first and second yokes can be positioned to cause the vacuum belt assemblies 74 to diverge as they leave the die cutter 10. This facilitates the placement of side guides between individual stacks of die-cut blanks when a single die cutter is used to cut two or more sets of blanks in parallel. Even though the vacuum belt assemblies are no longer parallel, the blanks are still held in precise registry as they are moved from the rotary die cutter 10 to the blank stacking device 20.

From the foregoing, it should be apparent that an improved conveyor system has been described which positively grips blanks as they emerge from a rotary die cutter and maintains the blanks in precise registry until they are deposited into a blank stacking device. New and improved take-up guides, snubbing devices, and ramps have been described which markedly increase control over the moving blanks and permit marked increases in the speed with which the die cutter can be operated without jamming the conveyor system.

Of course, it will be apparent to those skilled in the art that various changes and modification can be made to the preferred embodiments described above. For example, this invention is not limited to systems which employ four vacuum belt assemblies. In alternate embodiments as few as one vacuum belt or a number greater than four can be employed. Furthermore, various features of the conveyor system described above can be utilized in variable pitch conveyor systems of the type which change in elevation to follow a growing stack of blanks. It should therefore be understood that the foregoing detailed description is intended merely to illustrate the presently preferred embodiments and not to limit the scope of the invention. It is the following claims, including all equivalents, which are intended to define the scope of the present invention.

I claim:

1. An improved conveyor system for conveying die cut blanks from a rotary die cutter to a blank stacking device, said conveyor system comprising:

vacuum belt conveyor means for suspending and transporting blanks from the rotary die cutter to the blank stacking device, said conveyor means comprising a perforated belt, means for translationally moving the belt, and means for generating a subatmospheric pressure on one side of the belt such that blanks brought into contact with the other side of the belt are held against the belt by atmospheric pressure, said conveyor means having a blank take-up section and a blank release section; and means for positioning the conveyor means between the rotary die cutter and the stacking device such that the blank take-up section is adjacent the die cutter, the blank release section is adjacent the stacking device, and the perforated belt of the conveyor means operates automatically to engage blanks before they have been released by the die cutter, to retain blanks in registry as they are transported to the stacking device, and then to release the in-registry blanks to the stacking device;

said positioning means further comprising a frame positioned between the die cutter and the blank stacking device, and first means, mounted to slide along the frame and secured to the conveyor means adjacent the blank take-up section, for mounting the blank take-up section of the conveyor means to the frame.

2. The invention of claim 1 wherein the first means comprises a first yoke.

3. The invention of claim 1 further comprising:

second means, mounted to slide along the frame and secured to the conveyor means adjacent the blank release section, for mounting the blank release section of the conveyor means to the frame.

4. The invention of claim 3 wherein the second means comprises a second yoke.

5. The invention of claim 3 wherein the second means comprises means for adjusting the lateral position of the blank release section with respect to the frame.

6. An improved conveyor system for conveying die cut blanks from a rotary die cutter to a blank stacking device, said conveyor system comprising:

a vacuum belt assembly having a blank take up section and a blank release section, said vacuum belt assembly comprising a perforated vacuum belt;

means, included in the vacuum belt assembly, for generating a subatmospheric pressure on one side of the belt;

means for translationally moving the belt;

a frame positioned between the die cutter and the stacking device;

first means for positioning the blank take up section of the belt assembly adjacent the die cutter such that blanks emerging from the die cutter are positively engaged by the vacuum belt before they are released by the die cutter, thereby ensuring that blanks are kept in registry on the belt assembly, said first means comprising a first yoke mounted to slide along the frame and secured to the belt assembly adjacent the blank take-up section; and second means for positioning the blank release section partially over the blank stacking device such that blanks are held in registry on the belt by the belt assembly until they are released to fall into the stacking device.

7. The invention of claim 6 wherein the second means comprises a second yoke mounted to slide along the frame and secured to the belt assembly adjacent the blank release section.

8. The invention of claim 7 wherein the second yoke comprises means for adjusting the lateral position of the blank release section with respect to the frame.

* * * * *